(12) United States Patent
Cao et al.

(10) Patent No.: US 12,395,284 B2
(45) Date of Patent: Aug. 19, 2025

(54) CROSS CARRIER FEEDBACK

(71) Applicant: QUALCOMM Incorporated, San Diego, CA (US)

(72) Inventors: Yiqing Cao, Beijing (CN); Wanshi Chen, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 17/629,199

(22) PCT Filed: Aug. 1, 2019

(86) PCT No.: PCT/CN2019/098785
§ 371 (c)(1),
(2) Date: Jan. 21, 2022

(87) PCT Pub. No.: WO2021/016976
PCT Pub. Date: Feb. 4, 2021

(65) Prior Publication Data
US 2022/0247525 A1    Aug. 4, 2022

(51) Int. Cl.
| H04L 5/00 | (2006.01) |
| H04L 1/1829 | (2023.01) |
| H04L 5/14 | (2006.01) |
| H04W 72/0453 | (2023.01) |
| H04W 74/0833 | (2024.01) |

(52) U.S. Cl.
CPC .......... *H04L 5/0032* (2013.01); *H04L 1/1861* (2013.01); *H04L 5/001* (2013.01); *H04L 5/0048* (2013.01); *H04L 5/14* (2013.01); *H04W 72/0453* (2013.01); *H04W 74/0833* (2013.01)

(58) Field of Classification Search
CPC ..... H04L 1/1861; H04L 5/001; H04L 5/0032; H04L 5/0048; H04L 5/0055; H04L 5/0094; H04L 5/14; H04W 72/0453; H04W 74/0833; H04W 74/0836
See application file for complete search history.

(56) References Cited

U.S. PATENT DOCUMENTS

| 2015/0223231 A1* | 8/2015 | Noh ...................... H04L 1/1861 370/329 |
| 2016/0323076 A1* | 11/2016 | Takeda .................. H04L 5/0032 |
| 2016/0374082 A1* | 12/2016 | Nguyen ............ H04W 72/0453 |
| 2017/0006491 A1 | 1/2017 | Chen et al. |
| 2017/0257849 A1* | 9/2017 | Oketani ................ H04W 72/23 |
| 2019/0028162 A1* | 1/2019 | Lee ....................... H04L 5/0048 |

(Continued)

FOREIGN PATENT DOCUMENTS

| CN | 108631952 A | 10/2018 |
| CN | 108633105 A | 10/2018 |

(Continued)

OTHER PUBLICATIONS

International Search Report and Written Opinion—PCT/CN2019/098785—ISA/EPO—Apr. 9, 2020.

(Continued)

*Primary Examiner* — Pao Sinkantarakorn
*Assistant Examiner* — Pawaris Sinkantarakorn
(74) *Attorney, Agent, or Firm* — Patterson & Sheridan LLP

(57) ABSTRACT

Certain aspects of the present disclosure provide techniques for cross-carrier feedback.

22 Claims, 5 Drawing Sheets

402 — RECEIVE DOWNLINK CONTROL INFORMATION (DCI) SCHEDULING UPLINK RESOURCES ON A SECONDARY CELL (SCELL) CONFIGURED ON A FIRST SPECTRUM, THE SCHEDULED UPLINK RESOURCES TO BE USED FOR TRANSMITTING UPLINK FEEDBACK FOR AT LEAST ONE DOWNLINK TRANSMISSION RELATING TO AT LEAST ONE OF A PRIMARY CELL (PCELL) OR ANOTHER SCELL CONFIGURED ON A SECOND SPECTRUM, WHEREIN A SINGLE PHYSICAL UPLINK CONTROL CHANNEL (PUCCH) IS ALLOWED TO BE CONFIGURED ON ONE OF THE FIRST OR SECOND SPECTRUMS AND WHEREIN ONCE CONFIGURED THE PUCCH CANNOT BE SWITCHED BETWEEN THE FIRST AND SECOND SPECTRUMS

404 — TRANSMIT THE UPLINK FEEDBACK USING THE SCHEDULED UPLINK RESOURCES IN THE FIRST SPECTRUM

(56) References Cited

U.S. PATENT DOCUMENTS

| | | | | |
|---|---|---|---|---|
| 2020/0022175 A1* | 1/2020 | Xiong | .................... | H04L 5/001 |
| 2020/0154496 A1* | 5/2020 | Yi | ........................ | H04W 72/04 |
| 2020/0169990 A1* | 5/2020 | Takeda | ..................... | H04J 1/00 |
| 2022/0368468 A1* | 11/2022 | Xiong | .............. | H04W 74/0833 |

FOREIGN PATENT DOCUMENTS

| | | | |
|---|---|---|---|
| CN | 108964848 A | | 12/2018 |
| CN | 109586876 A | | 4/2019 |
| WO | 2016161550 A1 | | 10/2016 |
| WO | 2019098893 A1 | | 5/2019 |

OTHER PUBLICATIONS

CATT: "Resource Allocation for PUCCH Format 3", 3GPP TSG RAN WG1 Meeting #62bis, R1-105153, 3rd Generation Partnership Project, Mobile Competence Centre, 650, Route Des Lucioles, F-06921 Sophia-Antipolis Cedex, France, vol. RAN WG1, No. Xi'an, Oct. 11, 2010, 3 Pages, Oct. 5, 2010, XP050450371, [retrieved on Oct. 5, 2010] the whole document.
Supplementary European Search Report—EP19939136—Search Authority—The Hague—Mar. 27, 2023.

\* cited by examiner

CROSS CARRIER FEEDBACK

CROSS-REFERENCE TO RELATED APPLICATIONS

This application is a national stage application under 35 U.S.C. 371 of PCT/CN2019/098785, filed Aug. 1, 2019, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for using uplink resources of a first spectrum for providing uplink feedback for downlink transmissions on a different second spectrum.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved utilization of time and frequency resources of a spectrum assigned to a network operator.

Certain aspects provide a method for wireless communication by a User Equipment (UE). The method generally includes receiving downlink control information (DCI) scheduling uplink resources on a secondary cell (SCell) configured on a first spectrum, the scheduled uplink resources to be used for transmitting uplink feedback for at least one downlink transmission relating to at least one of a primary cell (PCell) or another Scell configured on a second spectrum, wherein a single physical uplink control channel (PUCCH) is allowed to be configured on one of the first or second spectrums and wherein once configured the PUCCH cannot be switched between the first and second spectrums; and transmitting the uplink feedback using the scheduled uplink resources in the first spectrum.

Certain aspects provide a method for wireless communication by a Base Station (BS). The method generally includes transmitting downlink control information (DCI) scheduling uplink resources for a user equipment (UE) on a secondary cell (SCell) configured on a first spectrum, the scheduled uplink resources to be used for transmitting uplink feedback for at least one downlink transmission by the BS relating to at least one of a primary cell (PCell) or another Scell configured on a second spectrum, wherein a single physical uplink control channel (PUCCH) is allowed to be configured on one of the first or second spectrums and wherein once configured the PUCCH cannot be switched between the first and second spectrums; transmitting the at least one downlink transmission in the second spectrum; and receiving the uplink feedback from the UE using the scheduled uplink resources in the first spectrum.

Certain aspects of the present disclosure provide an apparatus for wireless communication by a UE. The apparatus generally includes at least one processor and a memory coupled to the at least one processor. The at least one processor is generally configured to receive downlink control information (DCI) scheduling uplink resources on a secondary cell (SCell) configured on a first spectrum, the scheduled uplink resources to be used for transmitting uplink feedback for at least one downlink transmission relating to at least one of a primary cell (PCell) or another Scell configured on a second spectrum, wherein a single physical uplink control channel (PUCCH) is allowed to be configured on one of the first or second spectrums and wherein once configured the PUCCH cannot be switched between the first and second spectrums; and transmit the uplink feedback using the scheduled uplink resources in the first spectrum.

Certain aspects of the present disclosure provide an apparatus for wireless communication by a BS. The apparatus generally includes at least one processor and a memory coupled to the at least one processor. The at least one processor is generally configured to transmit downlink control information (DCI) scheduling uplink resources for a user equipment (UE) on a secondary cell (SCell) configured on a first spectrum, the scheduled uplink resources to be used for transmitting uplink feedback for at least one downlink transmission by the BS relating to at least one of a primary cell (PCell) or another Scell configured on a second spectrum, wherein a single physical uplink control channel (PUCCH) is allowed to be configured on one of the first or second spectrums and wherein once configured the PUCCH cannot be switched between the first and second spectrums; transmit the at least one downlink transmission in the second spectrum; and receive the uplink feedback from the UE using the scheduled uplink resources in the first spectrum.

Certain aspects of the present disclosure provide a computer-readable medium for wireless communication by a UE, the computer-readable medium storing instructions which when processed by at least one processor perform a method. The method generally including receiving downlink control information (DCI) scheduling uplink resources on a secondary cell (SCell) configured on a first spectrum, the scheduled uplink resources to be used for transmitting uplink feedback for at least one downlink transmission relating to at least one of a primary cell (PCell) or another Scell configured on a second spectrum, wherein a single physical uplink control channel (PUCCH) is allowed to be configured on one of the first or second spectrums and wherein once configured the PUCCH cannot be switched between the first and second spectrums; and transmitting the uplink feedback using the scheduled uplink resources in the first spectrum.

Certain aspects of the present disclosure provide a computer-readable medium for wireless communication by a BS, the computer-readable medium storing instructions which when processed by at least one processor perform a method. The method generally includes transmitting downlink control information (DCI) scheduling uplink resources for a user equipment (UE) on a secondary cell (SCell) configured on a first spectrum, the scheduled uplink resources to be used for transmitting uplink feedback for at least one downlink transmission by the BS relating to at least one of a primary cell (PCell) or another Scell configured on a second spectrum, wherein a single physical uplink control channel (PUCCH) is allowed to be configured on one of the first or second spectrums and wherein once configured the PUCCH cannot be switched between the first and second spectrums; transmitting the at least one downlink transmission in the second spectrum; and receiving the uplink feedback from the UE using the scheduled uplink resources in the first spectrum.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
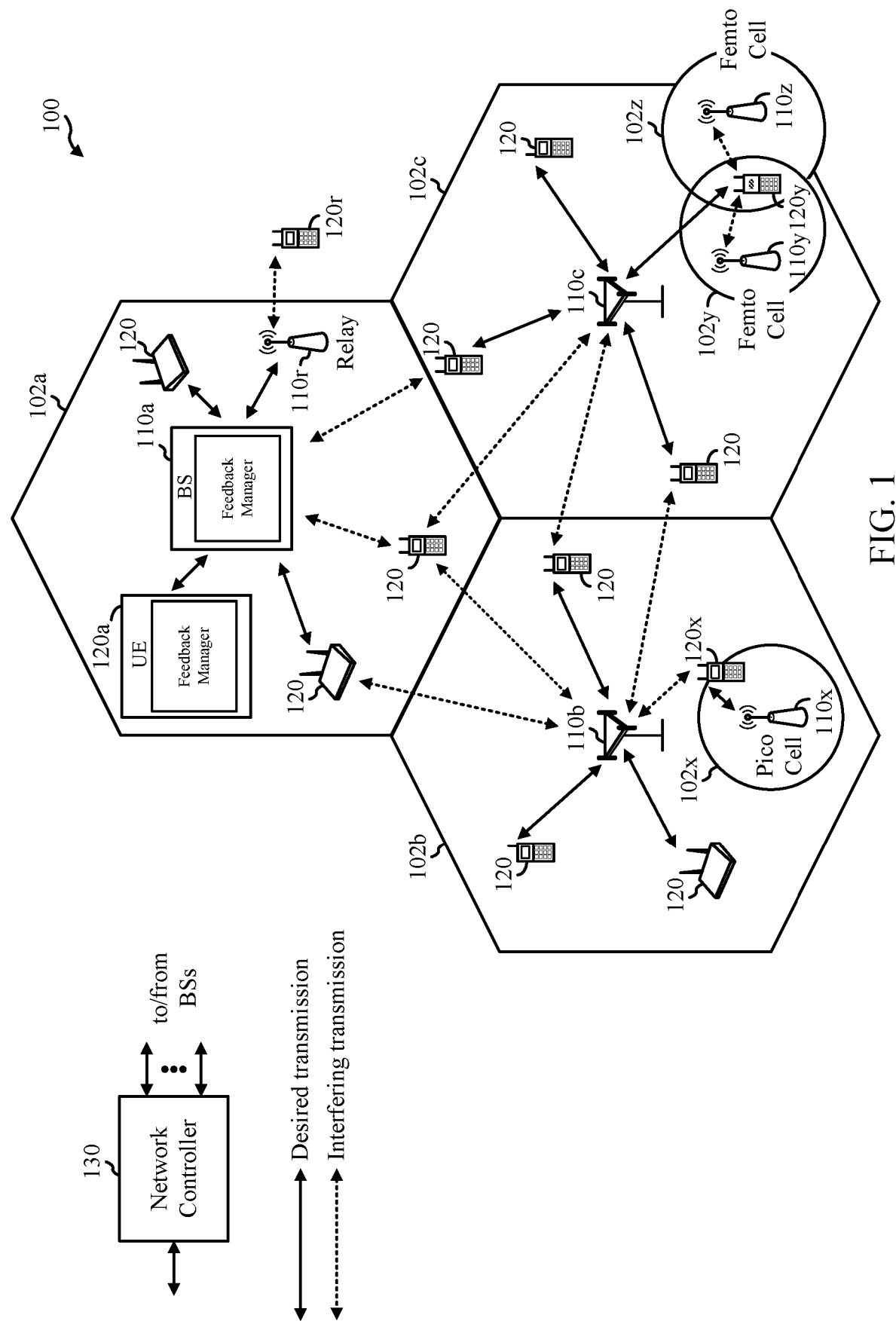
FIG. 1 is a block diagram conceptually illustrating an example telecommunications system, in accordance with certain aspects of the present disclosure.

Aspects of the present disclosure provide apparatus, methods, processing systems, and computer readable mediums for implementing cross-carrier feedback.

In certain aspects, better utilizing the underutilized or unutilized portions of a spectrum is beneficial from the network operator's perspective as this may lead to cost savings. In certain aspects, one approach to use underutilized or unutilized portions of a spectrum, especially when utilization of uplink resources is considerably less than that of downlink resources, is to implement cross-carrier feedback (also referred to as cross-spectrum feedback). For example, underutilized or unutilized uplink resources of a particular spectrum may be used for providing uplink feedback relating to downlink transmissions on a different spectrum.

In certain aspects, in order to implement the cross-carrier (or cross spectrum) feedback numerous limitations need to be addressed. These limitations may include limitations arising out of the RATs (e.g., NR/LTE) used for the spectrums and current standards agreements (e.g., 3GPP NR/LTE standards agreements) relating to the used RATs on these spectrums.

Certain aspects of the present disclosure discuss techniques for better utilizing spectrum resources given the limitations of the current 3GPP standards. The discussed aspects include improved techniques for using underutilized or unutilized uplink resources of a spectrum for providing uplink feedback relating to downlink transmissions on a different spectrum. These improved techniques enable cross-spectrum feedback in the context of carrier aggregation (CA) and supplementary uplink (SUL) while overcoming one or more of the limitations of CA and SUL discussed above.

The following description provides examples of cross-carrier feedback in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for cross-carrier feedback. As shown in FIG. 1, the BS 110a includes a feedback manager 112. The feedback manager 112 may be configured to transmit DCI scheduling uplink resources for a user equipment (UE) on a secondary cell (SCell) configured on a first spectrum, the scheduled uplink resources to be used for transmitting uplink feedback for at least one downlink transmission by the BS relating to at least one of a primary cell (PCell) or another Scell configured on a second spectrum, wherein PUCCH is allowed to be configured only on the PCell; transmit the at least one downlink transmission in the second spectrum; and receive the uplink feedback from the UE using the scheduled uplink resources in the first spectrum, in accordance with aspects of the present disclosure. As shown in FIG. 1, the UE 120a includes a feedback manager 122. The feedback manager 122 may be configured to receive downlink control information (DCI) scheduling uplink resources on a secondary cell (SCell) configured on a first spectrum, the scheduled uplink resources to be used for transmitting uplink feedback for at least one downlink transmission relating to at least one of a primary cell (PCell) or another Scell configured on a second spectrum, wherein a physical uplink control channel (PUCCH) is allowed to be configured only on the PCell; and transmit the uplink feedback using the scheduled uplink resources in the first spectrum, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
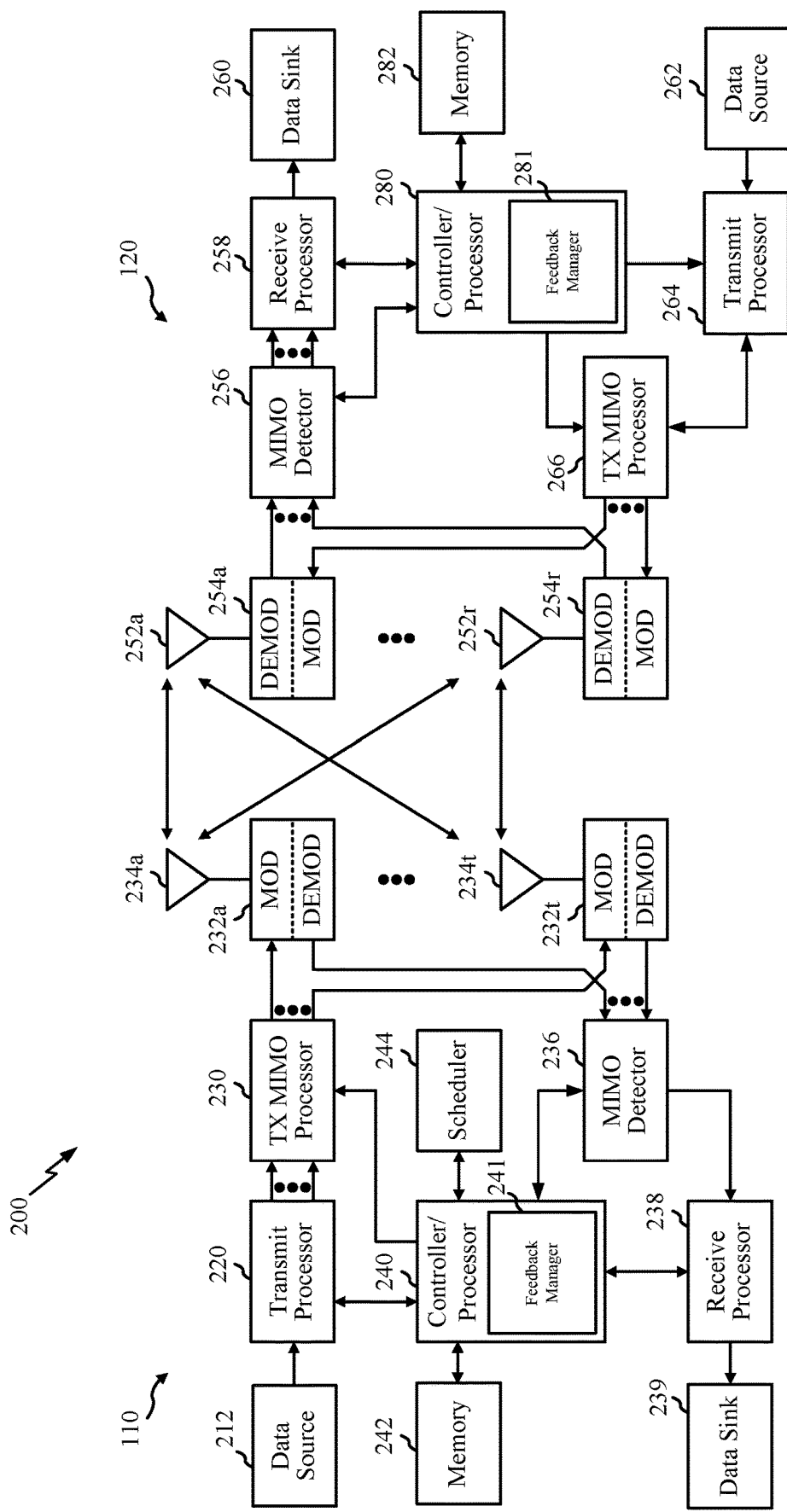
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has an feedback manager 241 that may be configured for transmit DCI scheduling uplink resources for a user equipment (UE) on a secondary cell (SCell) configured on a first spectrum, the scheduled uplink resources to be used for transmitting uplink feedback for at least one downlink transmission by the BS relating to at least one of a primary cell (PCell) or another Scell configured on a second spectrum, wherein the PUCCH is allowed to be configured only on the PCell; transmit the at least one downlink transmission in the second spectrum; and receive the uplink feedback from the UE using the scheduled uplink resources in the first spectrum, in accordance with aspects of the present disclosure. As shown in FIG. 2, the controller/processor 280 of the UE 120a has a feedback manager 241 that may be configured to receive downlink control information (DCI) scheduling uplink resources on a secondary cell (SCell) configured on a first spectrum, the scheduled uplink resources to be used for transmitting uplink feedback for at least one downlink transmission relating to at least one of a primary cell (PCell) or another Scell configured on a second spectrum, wherein a physical uplink control channel (PUCCH) is allowed to be configured only on the PCell; and transmit the uplink feedback using the scheduled uplink resources in the first spectrum, in accordance with aspects of the present disclosure. Although shown at the Controller/Processor, other components of the UE 120a and BS 110a may be used performing the operations described herein.

Example Cross Carrier Feedback

The term 'spectrum' (also referred to as 'band') as used in the context of wireless communication technology generally refers to an electromagnetic spectrum containing a set of frequencies (e.g., carrier frequencies) that is available and used for wireless communications between devices of a wireless communications network. Electromagnetic spectrums are generally regulated by national organizations such as the Federal Communications Commission in the U.S.A and China Telecom Corp., Ltd. in China, and these organizations determine which frequency ranges can be used for what purpose and by whom. Generally, each network operator in a country is assigned one or more spectrums. In an aspect, these spectrums may include Time Division Duplex (TDD) spectrums and/or Frequency Division Duplex (FDD) spectrums. Further, different spectrums may be used for communications using different Radio Access technologies (RATs). For example, a particular spectrum may be assigned for wireless communications in accordance with LTE or NR set of standards.

Network operators are always trying to better utilize the spectrums assigned to them to optimize costs. However, in certain cases some portions of an assigned spectrum are not optimally utilized from the network operator's perspective. For example, traffic in a particular spectrum can be downlink centric and the utilization of spectrum resources (e.g., time and/or frequency resources) assigned for downlink communication is much higher than the utilization of spectrum resources assigned for uplink communication. In certain cases, more than 50% of uplink resources of a spectrum may not be utilized at all. For example, it has been observed that more than 50% of the uplink resources of certain FDD spectrums may remain unutilized when downlink resources of these FDD spectrums are almost exhausted in a busy hour.

In certain aspects, better utilizing the underutilized or unutilized portions of a spectrum is beneficial from the network operator's perspective as this may lead to cost savings. In certain aspects, one approach to use underutilized or unutilized portions of a spectrum, especially when utilization of uplink resources is considerably less than that of downlink resources, is to implement cross-carrier feedback (also referred to as cross-spectrum feedback). For example, underutilized or unutilized uplink resources of a particular spectrum may be used for providing uplink feedback relating to downlink transmissions on a different spectrum.

It may be noted that cross-carrier feedback and cross-spectrum feedback are used interchangeably throughout this disclosure.

In one example implementation, unutilized FDD uplink resources of a first FDD spectrum may be used to provide uplink feedback relating to TDD downlink transmissions on a second different TDD spectrum. This way, the unutilized FDD uplink resources may be leveraged for improving performance of UEs, for example, of cell edge UEs in terms of throughput as well as delays. Further, by more fully utilizing the spectrum, the network operator saves costs.

Figure 3:
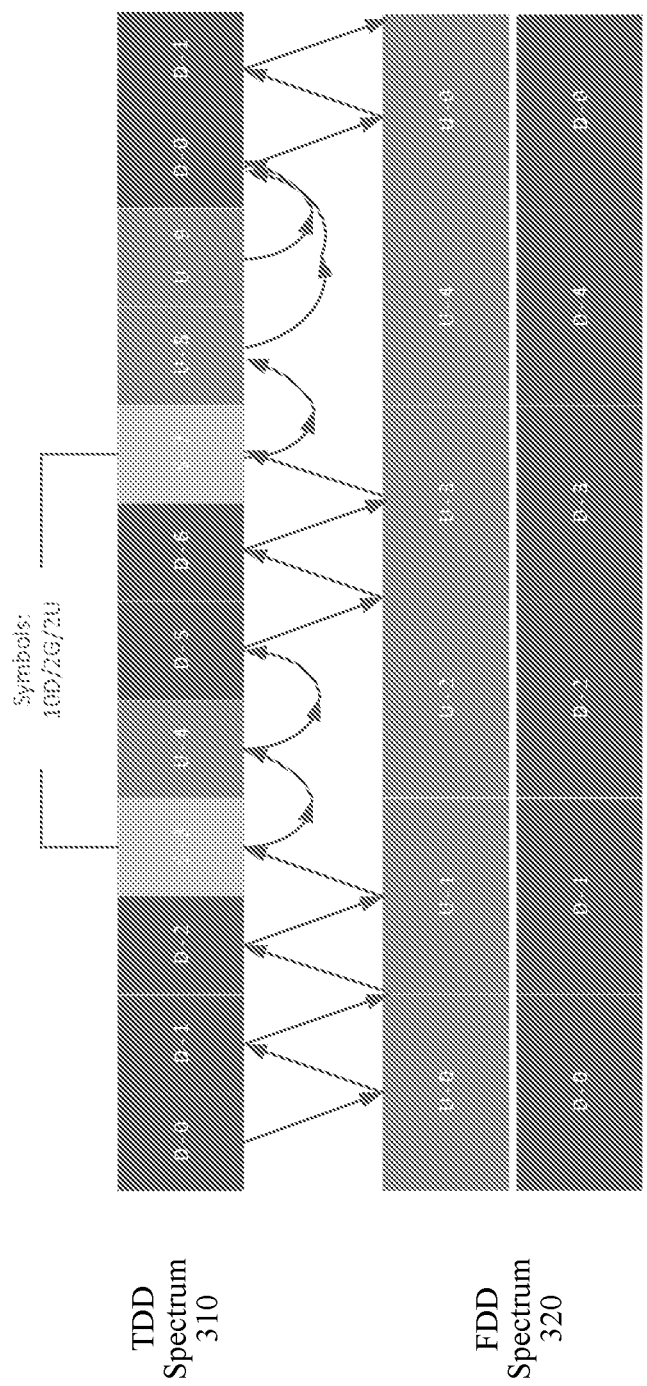
FIG. 3 illustrates an example utilization of uplink resources of an FDD spectrum for providing uplink feedback relating to TDD downlink transmissions carried out using downlink resources of a TDD spectrum, in accordance with certain aspects of the present disclosure.

FIG. 3 illustrates an example utilization of uplink resources of an FDD spectrum for providing uplink feedback relating to TDD downlink transmissions carried out using downlink resources of a TDD spectrum, in accordance with certain aspects of the present disclosure.

As shown in FIG. 3, the TDD spectrum 310 includes downlink slots (slots numbered as one of D-0, D-1, D-2, D-5 and D-6), uplink slots (slots numbered as U-4, U-8 and U-9) and special slots (numbered as S-3 and S-7). Each of the special slots S-3 and S-7 include 10 downlink symbols, 2 gap symbols and 2 uplink symbols.

As shown, the FDD spectrum 320 includes uplink slots (slots numbered as one of U-0, U-1, U-2, U-3 and U-4) and downlink slots (slots numbered as one of D-0, D-1, D-2, D-3 and D-4). As shown, for the FDD spectrum, the uplink slots and the downlink slots are allocated on different frequencies/carriers.

In an aspect, uplink feedback corresponding to downlink transmissions (e.g., using the downlink slots of the TDD spectrum) may be transmitted on the FDD spectrum (e.g., using the uplink slots of the FDD spectrum). As noted above, the uplink feedback may use unutilized uplink slots of the FDD spectrum. The unutilized uplink slots may include uplink slots of the FDD spectrum on which no uplink data transmission is scheduled. This cross-spectrum uplink feedback is shown in FIG. 3 by arrows between the downlink slots of the TDD spectrum and the uplink slots of the FDD spectrum. In an aspect, the uplink feedback may include ACK/NACK feedback, measurement reports and other uplink control information (UCI) including sounding reference signals SRS.

In an aspect, the FDD and TDD spectrums may be assigned for communications using different Radio Access Technologies. For example, the FDD spectrum is assigned for LTE communication and the TDD spectrum is assigned for NR communication. In other aspects, both the FDD and TDD spectrums may be assigned for communication using the same RAT. For example, both the FDD and TDD spectrums may be assigned for NR communication. In an aspect, both the FDD and TDD spectrums may be assigned to a single network operator. In an aspect, the FDD and the TDD spectrums may be assigned to different network operators.

In certain aspects, in order to implement the cross-carrier (or cross spectrum) feedback, similar to the example illustrated in FIG. 3, numerous limitations need to be addressed. These limitations may include limitations arising out of the RATs (e.g., NR/LTE) used for the spectrums and current standards agreements (e.g., 3GPP NR/LTE standards agreements) relating to the used RATs on these spectrums.

For example, in the context of carrier aggregation (CA) and supplementary uplink (SUL) the current 3GPP standards only support one PUCCH which cannot be dynamically switched between carriers. Further, in the context of CA, current 3GPP standards (e.g., NR standards) allow PUCCH to be configured only at the PCell.

Going back to the example of FIG. 3, if the TDD spectrum is configured as PCell and the FDD spectrum is configured as SCell, PUCCH cannot be configured at the SCell of the FDD spectrum according to the current 3GPP specifications. Thus, UCI including ACK/NACK feedback for the downlink TDD transmissions on the TDD spectrum cannot be transmitted on PUCCH. Further, if no uplink data (e.g., PUSCH data) is scheduled at the SCell of the FDD spectrum, there is no way for the UE to transmit UCI corresponding to the PCell PDSCH of the TDD spectrum.

Alternatively, even if the FDD spectrum is configured as the PCell, there are limitations. For example, when the FDD spectrum has a considerably smaller bandwidth than the TDD spectrum and if the FDD spectrum is configured as the PCell, the scheduling overhead including overhead for scheduling SCell UL and/or DL traffic on the TDD spectrum may occupy a large portion of the bandwidth of the FDD spectrum. For example, if the TDD spectrum has a 100 MHz bandwidth and the FDD spectrum has a 20 MHz bandwidth, the scheduling overhead on the FDD spectrum for scheduling UL and/or DL traffic on the 100 MHz TDD spectrum may occupy a large portion of the much smaller FDD spectrum. Additionally or alternatively, the FDD and TDD spectrums may support different slot lengths, and thus, transmitting scheduling information (e.g., DCI on PDCCH) on the FDD spectrum for scheduling UL and/or DL transmissions on the TDD spectrum may provide reduced flexibility. For example, if the FDD spectrum is assigned for LTE communications and the TDD spectrum is assigned for NR communications, the slot length of the LTE slots which may be 1 ms slots provide reduced flexibility for scheduling UL and/or DL transmissions on the NR slots which may be 0.5 ms slots.

In the context of supplementary uplink (SUL), even if PUCCH is configured as SUL on the FDD spectrum, there are certain limitations. For example, when the FDD spectrum has a considerably smaller bandwidth than the TDD spectrum and if PUCCH is configured as SUL on the FDD spectrum, the uplink feedback corresponding to the TDD DL transmissions may result in a large overhead as the TDD spectrum may have a large amount of downlink traffic owing to a much larger bandwidth.

Certain aspects of the present disclosure discuss techniques for better utilizing spectrum resources given the limitations of the current 3GPP standards. The discussed aspects include improved techniques for using underutilized or unutilized uplink resources of a spectrum for providing uplink feedback relating to downlink transmissions on a different spectrum. These improved techniques enable cross-spectrum feedback in the context of CA and SUL while overcoming one or more of the limitations of CA and SUL discussed above.

Figure 4:
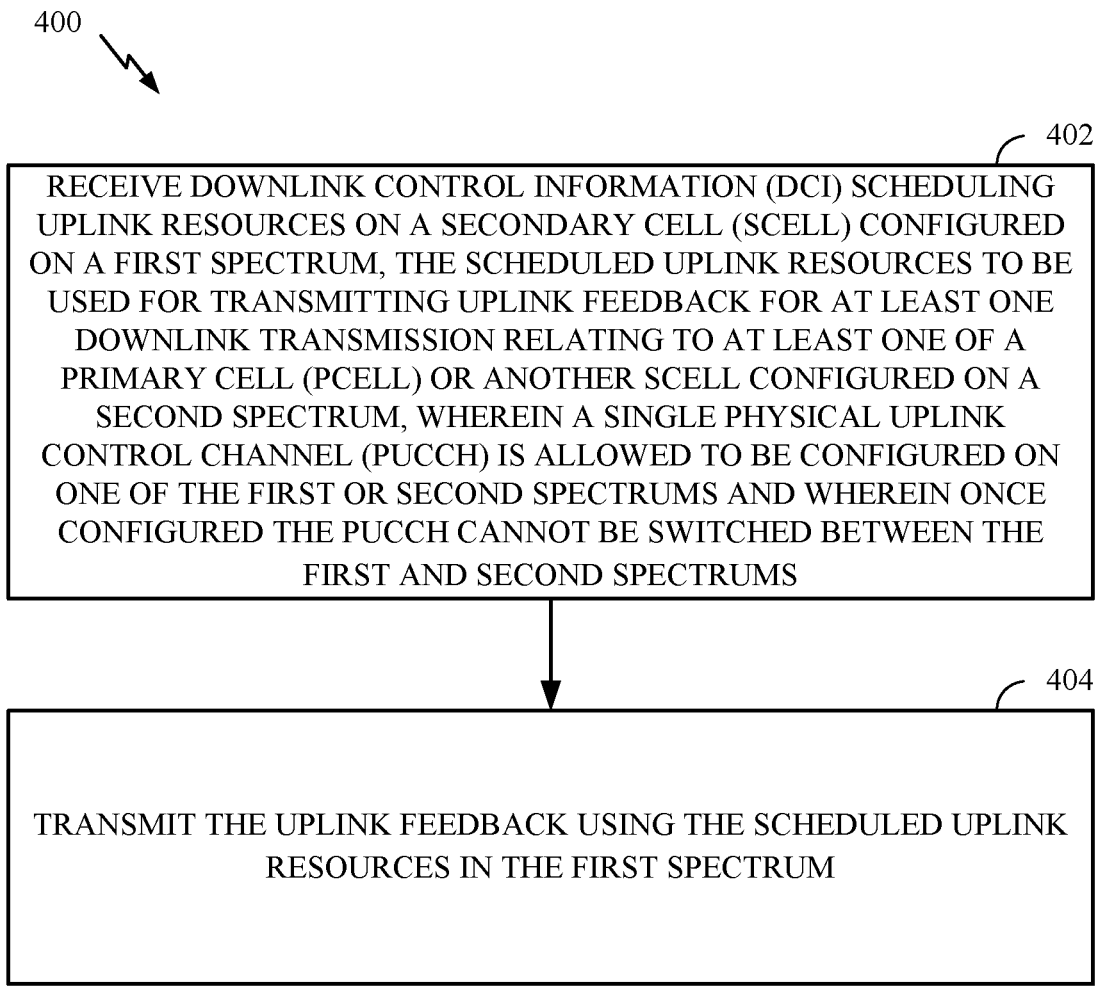
FIG. 4 illustrates example operations that may be performed by a UE for transmitting cross-spectrum feedback, in accordance with certain aspects of the present disclosure.

FIG. 4 illustrates example operations 400 that may be performed by a UE for transmitting cross-spectrum feedback, in accordance with certain aspects of the present disclosure.

Operations 400 begin, at 402, by receiving DCI that schedules uplink resources on a SCell configured on a first spectrum, the scheduled uplink resources to be used for transmitting uplink feedback for at least one downlink transmission relating to at least one of a PCell or another SCell configured on a second spectrum, wherein a single PUCCH is allowed to be configured on one of the first or second spectrums and wherein once configured the PUCCH cannot be switched between the first and second spectrums.

At 404, the UE transmits the uplink feedback using the scheduled uplink resources in the first spectrum.

Figure 5:
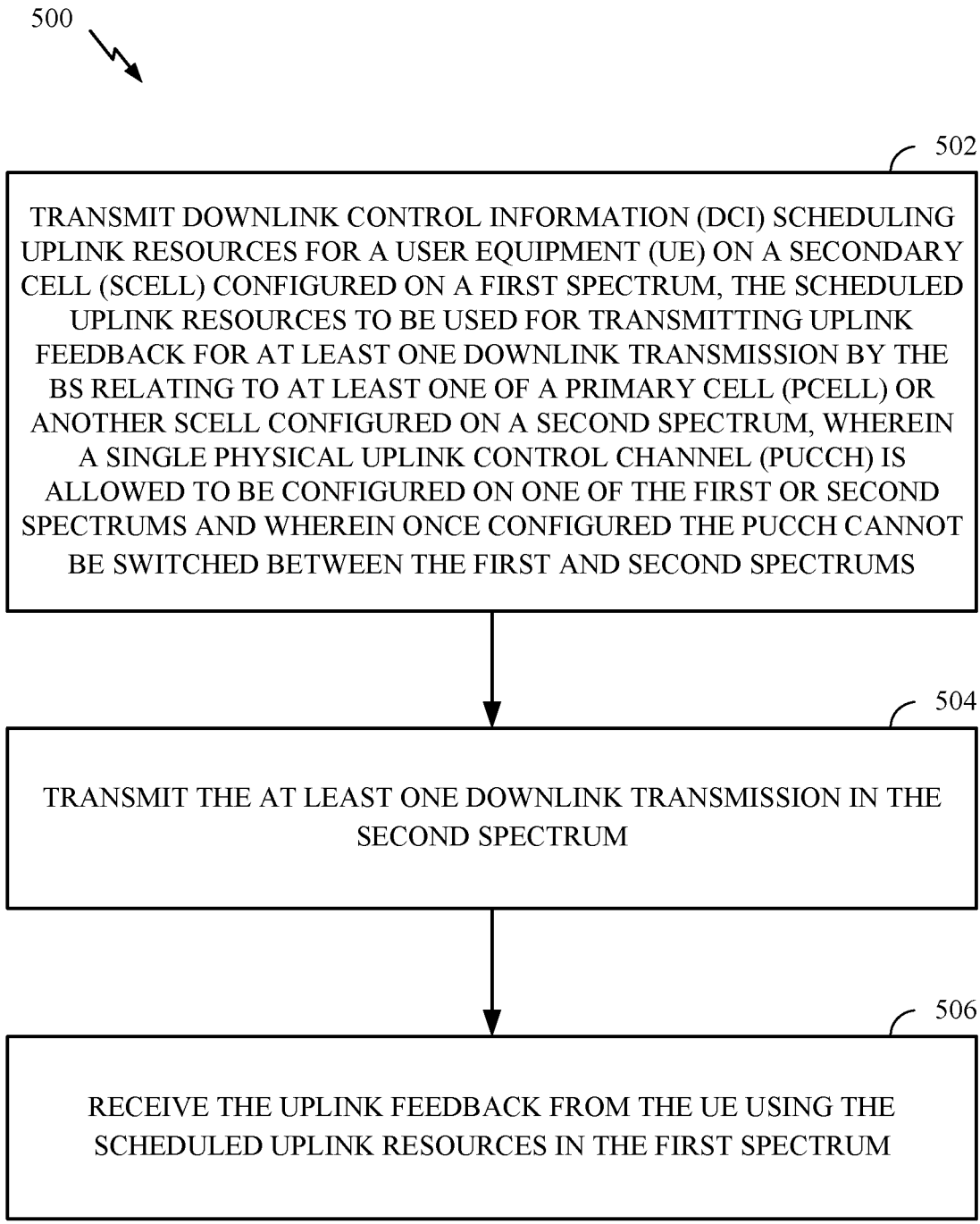
FIG. 5 illustrates example operations that may be performed by a Base station (BS) for scheduling cross-spectrum feedback, in accordance with certain aspects of the present disclosure.

FIG. 5 illustrates example operations 500 that may be performed by a Base station (BS) for scheduling cross-spectrum feedback, in accordance with certain aspects of the present disclosure.

Operations 500 begin, at 502, by transmitting DCI that schedules uplink resources for a UE on a SCell configured on a first spectrum, the scheduled uplink resources to be used for transmitting uplink feedback for at least one downlink transmission by the BS relating to at least one of a primary cell PCell or another Scell configured on a second spectrum, wherein a single PUCCH is allowed to be configured on one of the first or second spectrums and wherein once configured the PUCCH cannot be switched between the first and second spectrums.

At 504, the BS transmits the at least one downlink transmission in the second spectrum.

At 506, the BS receives the uplink feedback from the UE using the scheduled uplink resources in the first spectrum.

In an aspect, first spectrum is an FDD spectrum and the scheduled uplink resources include resources configured for uplink FDD transmissions, and wherein second spectrum is a TDD spectrum and the downlink transmissions include downlink TDD transmissions scheduled on the second spectrum.

In an aspect, the DCI may be transmitted in the first spectrum or the second spectrum.

In certain aspects, in order to implement the cross-spectrum feedback, additional uplink feedback including (e.g., additional UCI not defined in current 3GPP standards) may be defined, for example, when a carrier/cell does not have configured PUCCH for transmission of uplink feedback. This additional UCI may include ACK/NACK feedback for providing feedback for DL transmissions on a different spectrum, measurement reports such as PCell measurement reports including interference measurements (based on Channel State Information (CSI)-Interference Measurement (IM)) and RSRP, RSRQ, and SNR measurements (based on CSI-RS or SSB). The additional UCI may further include uplink channel sounding (e.g., Aperiodic SRS) and positioning information (e.g., based on positioning reference signals, PRS).

In certain aspects, the additional UCI may be transmitted by the UE using DCI/PDCCH scheduled contention-free random access (CFRA). In the context of cross-spectrum feedback, this method may be used when PUCCH is not scheduled for the spectrum (e.g., FDD spectrum of FIG. 3) to be used for the UCI feedback. For example, when the TDD spectrum is configured as PCell, PUCCH is not allowed to be configured on the FDD spectrum in accordance with the current 3GPP standards. In such a case, the uplink feedback may be transmitted using the additional UCI as discussed in aspects of the present disclosure. Generally, for CFRA, the BS schedules the transmission configuration of the CFRA procedure including time and frequency resources for each UE (UE-specific configuration) when the UE is in a connected mode, wherein the scheduled time and frequency resources are to be used by the UE for transmitting RACH messages to the BS. In an aspect, the scheduled time and frequency resources include uplink resources scheduled for transmitting a PUSCH payload of certain RACH messages to be transmitted by the UE. This ensures that the UE has dedicated resources for random access as compared to contention based random access when the UE randomly selects resources for transmitting a RACH preamble and the contention is resolved later. Thus, in an aspect, using the CFRA procedures for UCI feedback helps achieve the required latency requirements for communication between the BS and the UE.

In an aspect, a 2-step CFRA procedure or a 4-step CFRA procedure may be used for transmitting the UCI. When using the 2-step CFRA procedure, a PUSCH payload portion of a first message (MSG-A) of the 2-step CFRA procedure may be used to transmit the UCI. When using the 4-step CFRA procedure, a PUSCH payload portion of a third message (MSG-3) of the 4-step CFRA procedure may be used to transmit the UCI. As noted above, the PUSCH payloads of MSG-A and MSG-3 are scheduled by DCI.

In an aspect, the 2-step CFRA and the 4-step CFRA have different latency performance in the context of transmitting the UCI. For example, since MSG-A is the first message of the 2-step CFRA, the 2-step CFRA has a better latency performance. In an aspect, one of the two CFRA procedures may be configured based on the latency requirement of the information to be included in the UCI. In an aspect, since the 2-step CFRA has a better latency performance, the 2-step CFRA using MSG-A PUSCH payload for transmitting UCI is preferable for low latency UCI report such as including ACK/CSI-IM (layer 1 environment). In an aspect, since the 4-step CFRA using MSG-3 for UCI transmission has a reduced latency performance, it is acceptable for transmission of UCI such as including RSRP/RSRQ/SNR (e.g., layer 3 environment) report that has a more relaxed latency requirement. Thus, in an aspect, the BS could schedule 2-step or 4-step CFRA based on the feedback UCI type. In an aspect, the 2-step CFRA is configured for feedback with a stricter latency requirement such as including ACK/CSI-IM. In an aspect, the 2-step or 4-step CFRA may be configured for the feedback with a more relaxed latency requirement such as including RSRP/RSRQ/SNR.

As noted above, the uplink transmission configuration for the CFRA is user specific. Thus, the PDCCH used for scheduling the CFRA is in a user-specific search space. In an aspect, an identifier used for scrambling the cyclic redundancy check (CRC) can be UE specific or cell specific.

In an aspect, in order to guarantee the latency requirements (e.g. HARQ timeline, CSI measurement etc.) of communication between the BS and UE, the RACH Occasions (ROs) may be configured in different carriers of the same time position. This ensures alignment in the time domain to achieve the required latency by providing more flexibility in the frequency domain.

In certain aspects, the downlink grant included in the DCI/PDCCH for scheduling the CFRA may include several elements to facilitate the UCI feedback in the RACH messages. In an aspect, to facilitate ACK/NACK feedback to be included in the UCI, the DL grant includes one or more of a Downlink Assignment Index (DAI) to very the HARQ process, one or more HARQ process numbers corresponding to one or more HARQ processes for which feedback is to be included in the uplink feedback, information relating to time and frequency resources assigned to one or more RACH occasions (ROs) to be used for transmitting the uplink feedback, an indicator indicating whether transmitting the uplink feedback using the RACH procedure is enabled, indication of the SCell to be used for transmitting the uplink feedback, or configuration of a sounding reference signal (SRS) to be transmitted in the measurement report. In an aspect, multiple HARQ process numbers are included in the DL grant if ACK/NACKs corresponding to multiple HARQ processes are expected to be bundled in MSG-A/MSG-3. In an aspect, the time information corresponding to the ROs includes a parameter 'K1' that indicates the ACK/NACK slot number to be used.

In an aspect, to facilitate measurement report feedback to be included in the UCI, the DL grant includes configuration of reference signals including configuration for CSI-RS, Synchronization Signal Block (SSB), Positioning Reference Signals (PRS). In an aspect, one or more measurement reports based on one or more of these reference signals is included in the UCI feedback in MSG-A/MSG-3.

In an aspect, the DL grant further includes SRS configuration for SRS to be transmitted in the UCI feedback for use in UL measurements by the BS. Additionally or alternatively, MSG-A may be configured to be a short version which can allow A-SRS within one slot. This may lead to power savings as MSG-A is transmitted in one slot instead of multiple slots.

In an aspect, both single feedback and bundled feedback from a single UE may be supported for transmission feedback using the CFRA messages. For example, 1 bit ACK/NACK for a single HARQ process or multiple bits ACK/NACK for multiple HARQ processes may be supported in a single UL UCI transmission.

In an aspect, UE identifier (e.g. RNTI) may be transmitted in MSG-A/MSG-3 to help BS to associate a received UCI feedback with transmitting UE and HARQ process or measurement request. In an aspect, the UE ID could be one or a combination of a sequence ID (configured by BS), a payload content and scrambling of MSG A/MSG 3 CRC.

In an aspect, group feedback may be supported in a single uplink feedback transmission in a PUSCH payload MSG-A/MSG-3. Further, a single UCI transmission can include feedback relating to cells of a single cell group or cells of multiple cell groups. For example, the UCI feedback can be for multiple carriers including Pcell and Scells in one cell group, or cells from different cell groups (e.g., Group 1 Pcell+Group 2 pcell/scell).

In accordance with current NR standards, if PUSCH is configured for a cell, UCI can be piggybacked on to the PUSCH resources. That is UCI can be transmitted using PUSCH resources. Thus, in an aspect, in the context of cross-spectrum scheduling, if at least one SCell is scheduled on a spectrum (e.g., FDD spectrum of FIG. 3) to be used for uplink feedback of DL transmissions on a different spectrum (e.g., TDD spectrum), and if PUSCH is configured for the SCell, BS does not schedule the CFRA for UCI feedback as UCI this is already supported by PUSCH piggybacking. In this case, UCI feedback (e.g., including the additional UCI discussed above) can be transmitted piggybacked on the configured SCell PUSCH. In an aspect, the piggybacked UCI method may be used when PUCCH is configured as SUL. In this context, by transmitting the UCI piggybacked on PUSCH instead of transmitting on PUCCH, large feedback overheads may be avoided on the PUCCH. In the example of FIG. 3, if PUCCH is configured as SUL on the FDD spectrum, the UCI is transmitted using PUSCH resources of the FDD spectrum instead of using the PUCCH resources of the FDD spectrum.

In certain aspects, when the UE does not have any data to transmit on the PUSCH, the entire PUSCH resources can be used to transmit the UCI. In this context, all frequencies and symbols configured for PUSCH are allocated for the UCI transmission. Current NR standards define a beta_offset when UCI transmission is piggybacked on PUSCH. The beta_offset is used by the UE to calculate how much resource in the PUSCH is to be used for UCI transmission. To enable the UCI to use the full PUSCH resource, a new beta_offset may be defined for this UCI only mode in order to enable the UE to use the entire PUSCH resource for the UCI transmission. In an aspect, a new indicator may be defined to indicate to the UE that a PUSCH is a UCI only PUSCH. Optionally, the CRC of the UCI feedback may be scrambled by a new RNTI.

In certain aspects, in order to randomize interference, the UCI (transmitted in the CFRA messages or piggybacked on PUSCH) may be scrambled. The UE ID can be UE specific or cell specific. The UE ID can be included in the PUSCH. A cell specific scrambling ID can be a function of C-RNTI, cell ID of PCell or carrier ID of cell group. A UE specific scrambling ID can be a function of a UE specific RNTI, cell ID of PCell, or carrier ID of cell group. In an aspect, the same scrambling ID or different scrambling IDs can be used for UCI and PUSCH.

In an aspect, if multiple carriers are configured, the BS selects one or more carriers for the UCI feedback in accordance with aspects discussed in this disclosure.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4 and/or FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
receiving downlink control information (DCI) scheduling uplink resources, wherein the uplink resources are scheduled on a secondary cell (SCell) configured on a first spectrum, the scheduled uplink resources to be used for transmitting uplink feedback for at least one downlink transmission relating to at least one of a primary cell (PCell) or another Scell configured on a second spectrum, wherein the DCI schedules the uplink resources on a physical uplink shared channel (PUSCH), wherein the PUSCH is on the SCell, the uplink resources being scheduled on the PUSCH of the first spectrum and not on a physical uplink control channel (PUCCH) on the first spectrum based on the PUCCH being configured as supplemental uplink (SUL) on the first spectrum; and
transmitting the uplink feedback using the scheduled uplink resources in the first spectrum.

2. The method of claim 1, wherein the uplink resources are scheduled on the PUSCH based on the first spectrum being a frequency division duplex (FDD) spectrum and the second spectrum being a Time Division Duplex (TDD) spectrum.

3. The method of claim 1, wherein the scheduled uplink resources include resources scheduled for the PUSCH of a message used for a random access channel (RACH) procedure.

4. The method of claim 3, wherein the RACH procedure is a 2-step RACH procedure and wherein the message includes a first message of the 2-step RACH procedure.

5. The method of claim 4, further comprising determining whether to transmit the uplink feedback using the 2-step RACH procedure or using a 4-step RACH procedure, wherein the determining is a function of a latency requirement of information to be transmitted in the uplink feedback.

6. The method of claim 5, further comprising determining to transmit the uplink feedback using the 2-step RACH procedure when transmitting at least one of acknowledgement (ACK)-negative ACK (NACK) feedback or Channel State Information (CSI)-Interference Measurement (IM) feedback in the uplink feedback.

7. The method of claim 5, further comprising determining to transmit the uplink feedback using at least one of the 2-step RACH procedure or the 4-step RACH procedure when transmitting a measurement report in the uplink feedback including at least one of reference signal received power (RSRP), reference signal received quality (RSRQ) or signal to noise ratio (SNR).

8. The method of claim 3, wherein the RACH procedure is a 4-step RACH procedure and the message includes a third message of the 4-step RACH procedure.

9. The method of claim 3, wherein the RACH procedure is a contention-free RACH procedure.

10. The method of claim 3, wherein the DCI is received in a user-specific search space (USS).

11. The method of claim 3, wherein an identifier used to scramble Cyclic Redundancy Check (CRC) bits of a PUSCH payload is UE-specific or cell-specific.

12. The method of claim 3, wherein RACH occasions (ROs) for the RACH procedure are configured on different carriers at a same time position.

13. The method of claim 3, wherein for acknowledgement (ACK)-negative ACK (NACK) feedback to be included in the uplink feedback, the DCI includes at least one of:
a downlink assignment index (DAI),
one or more hybrid automatic repeat request (HARQ) process numbers corresponding to one or more HARQ processes for which feedback is to be included in the uplink feedback,
information relating to time and frequency resources assigned to one or more RACH occasions to be used for transmitting the uplink feedback,
an indicator indicating whether transmitting the uplink feedback using the RACH procedure is enabled, or
indication of the SCell to be used for transmitting the uplink feedback, or configuration of a sounding reference signal (SRS) to be transmitted in a measurement report.

14. The method of claim 13, wherein the SRS includes an aperiodic-SRS (A-SRS), wherein the A-SRS is configured to be transmitted within the same slot of a subframe as UL feedback.

15. The method of claim 3, wherein for at least one measurement report to be included in the uplink feedback, the DCI includes configuration of one or more reference signals to be used for measurements for the measurement report.

16. The method of claim 3, further comprising transmitting an identifier of the UE in the uplink feedback.

17. The method of claim 1, further comprising receiving a resource offset enabling the UE to use all of resources scheduled for the PUSCH for transmission of the uplink feedback.

18. The method of claim 1, wherein cyclic redundancy check (CRC) bits of the DCI are scrambled using an identifier of the UE or a cell specific RNTI.

19. The method of claim 1, wherein the at least one downlink transmission is across one or more carriers, and wherein the UE transmits the uplink feedback in a single uplink transmission across the one or more carriers, wherein the one or more carriers belong to one cell group or multiple cell groups.

20. The method of claim 1, wherein the DCI schedules the uplink resources on the PUSCH on the first spectrum even if no data is to be transmitted on the PUSCH when the first spectrum is configured for the SUL.

21. A method for wireless communications by a base station (BS), comprising:

transmitting downlink control information (DCI) scheduling uplink resources for a user equipment (UE), wherein the uplink resources are scheduled on a secondary cell (SCell) configured on a first spectrum, the scheduled uplink resources to be used for transmitting uplink feedback for at least one downlink transmission by the BS relating to at least one of a primary cell (PCell) or another Scell configured on a second spectrum, wherein the DCI schedules the uplink resources on a physical uplink shared channel (PUSCH), wherein the PUSCH is on the SCell, the uplink resources being scheduled on the PUSCH of the first spectrum and not on a physical uplink control channel (PUCCH) on the first spectrum based on the PUCCH being configured as supplemental uplink (SUL) on the first spectrum;

transmitting the at least one downlink transmission in the second spectrum; and receiving the uplink feedback from the UE using the scheduled uplink resources in the first spectrum.

22. An apparatus for wireless communication by a user equipment (UE), comprising:

one or more memories comprising instructions; and
one or more processors configured to execute the instructions and cause the UE to:
   receive downlink control information (DCI) scheduling uplink resources, wherein the uplink resources are scheduled on a secondary cell (SCell) configured on a first spectrum, the scheduled uplink resources to be used for transmitting uplink feedback for at least one downlink transmission relating to at least one of a primary cell (PCell) or another Scell configured on a second spectrum, wherein the DCI schedules the uplink resources on a physical uplink shared channel (PUSCH), wherein the PUSCH is on the SCell, the uplink resources being scheduled on the PUSCH of the first spectrum and not on a physical uplink control channel (PUCCH) on the first spectrum based on the PUCCH being configured as supplemental uplink (SUL) on the first spectrum; and
   transmit the uplink feedback using the scheduled uplink resources in the first spectrum.

* * * * *